United States Patent
Wu et al.

(10) Patent No.: US 6,992,329 B2
(45) Date of Patent: Jan. 31, 2006

(54) MULTI-DOMAIN VERTICAL ALIGNMENT LIQUID CRYSTAL DISPLAY

(75) Inventors: Yang-En Wu, Taipei (TW); Shih-Peng Tai, Kaohsiung (TW); Ming-Chou Wu, Nantou (TW)

(73) Assignee: AU Optronics Corp., Hsinchu (TW)

( * ) Notice: Subject to any disclaimer, the term of this patent is extended or adjusted under 35 U.S.C. 154(b) by 126 days.

(21) Appl. No.: 10/744,840

(22) Filed: Dec. 23, 2003

(65) Prior Publication Data

US 2004/0227884 A1    Nov. 18, 2004

(30) Foreign Application Priority Data

May 14, 2003    (TW) .............................. 92113143 A

(51) Int. Cl.
*H01L 31/20*    (2006.01)
*G09G 3/36*    (2006.01)
*G02F 1/1337*    (2006.01)

(52) U.S. Cl. .............................. 257/59; 257/21; 345/92; 345/95; 349/36; 349/129

(58) Field of Classification Search ..................... None
See application file for complete search history.

(56) References Cited

U.S. PATENT DOCUMENTS

| | | | |
|---|---|---|---|
| 6,449,025 B2 * | 9/2002 | Lee ............................ | 349/129 |
| 6,882,012 B2 * | 4/2005 | Yamazaki et al. .......... | 257/359 |
| 2001/0019322 A1 * | 9/2001 | Nakayama et al. ......... | 345/100 |

* cited by examiner

*Primary Examiner*—David Nelms
*Assistant Examiner*—Long Tran
(74) *Attorney, Agent, or Firm*—Thomas, Kayden, Horstemeyer & Risley

(57) ABSTRACT

A multi-domain vertical alignment liquid crystal display (MVA LCD) has a plurality of pixel electrodes for defining a plurality of pixel units. The pixel units are disposed in matrix arrangement, and each of them has a first electrode, a second electrode, and a third electrode. When a voltage is applied to said pixel electrode, the first electrode and the common electrode have a higher absolute voltage difference than the second electrode and the common electrode. The third electrode and the common electrode have the lowest absolute voltage difference.

8 Claims, 4 Drawing Sheets

MULTI-DOMAIN VERTICAL ALIGNMENT LIQUID CRYSTAL DISPLAY

This application claims the benefit of Taiwan application Serial No. 092113143, filed May 14, 2003.

BACKGROUND OF THE INVENTION

1. Field of the Invention

The invention relates in general to a liquid crystal display (LCD), and in particular, to a multi-domain vertical alignment LCD (MVA LCD).

2. Description of the Related Art

The multi-domain vertical alignment liquid crystal display (MVA LCD) has a wide viewing angle, compared to the traditional LCD. FIG. 1 is a cross section of the traditional MVA LCD when no voltage is applied. An electrode 12a is formed on a substrate 11a. A bump 13a, composed of insulating material, is formed on the electrode 12a. The bump 13a and the electrode 12a are covered by a vertical alignment film 14a. Furthermore, an electrode 12b is formed below a substrate 11b. Also, a bump 13b of the insulating material is formed below the electrode 12b. The bump 13b and the electrode 12b are covered by a vertical alignment film 14b.

While no voltage is applied to the electrode 12a and 12b, the liquid crystal molecules 15 are oriented substantially perpendicular, i.e, at the angle of about 85~90 degree, to the alignment film. When a voltage is applied across the electrode 12a and 12b, the liquid crystal molecules 15 around the bumps will tilt and induce the inclination of those liquid crystal molecules 15 distant from the bumps. The liquid crystal molecules 15 on the two sides of the bumps tilt in opposite directions, such that the liquid crystal molecules 15 automatically form several display domains.

Other kinds of MVA LCD have either bumps on the upper substrate and slits on the lower substrate, or have slits on both the upper and lower substrates. They all utilize an electric field to induce the tilting of the liquid crystal molecules. They also need additional processing steps for the upper and lower substrates, which increases the cost and complexity of manufacturing.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The present invention achieves a multi-domain effect by simply forming slits in the pixel electrode of one substrate. High, medium, and low voltages are created, and inclined electric fields are produced. Therefore, the liquid crystal molecules are aligned at different tilt angles, and several domains are formed.

Figure 1:
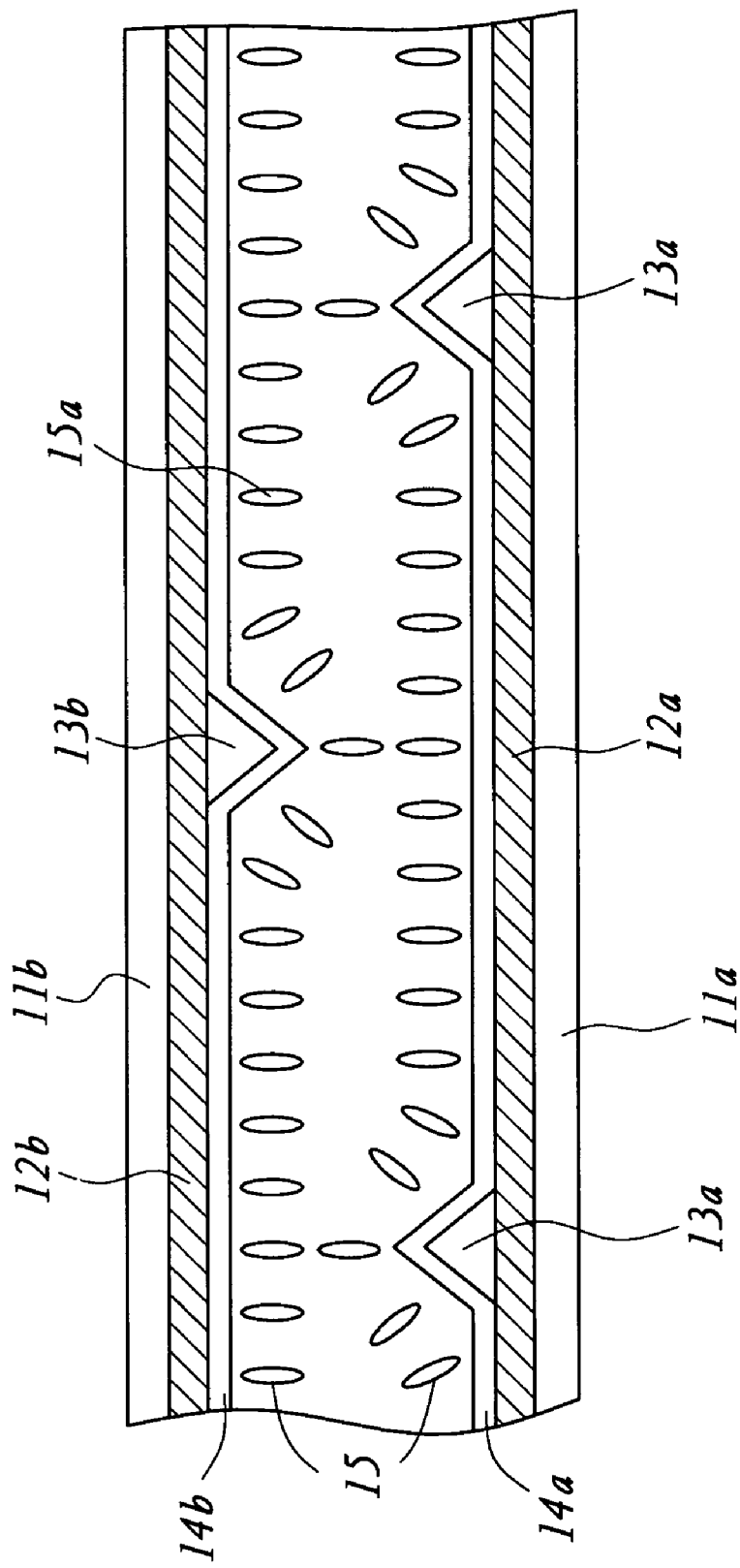
FIG. 1 (Prior Art) is a cross section of the traditional MVA LCD, to which no voltage is applied.
Figure 2:
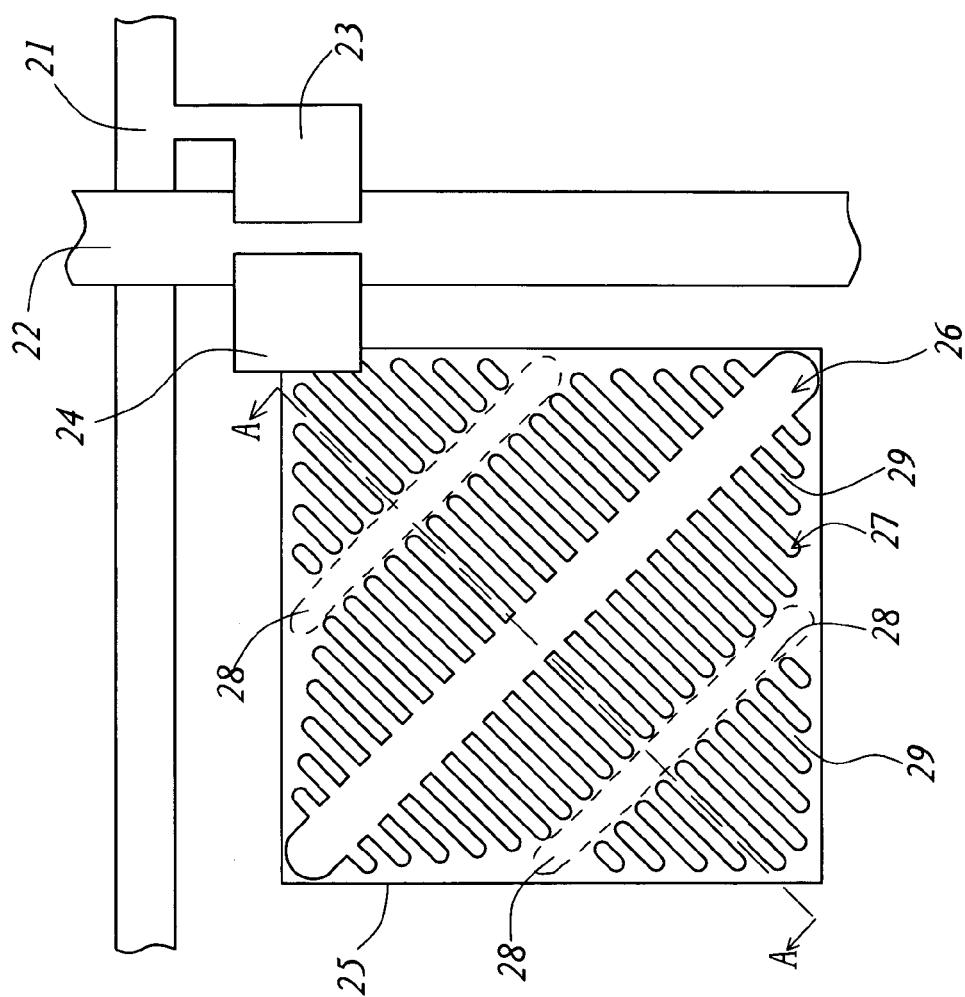
FIG. 2 is a top view of one pixel unit for the multi-domain vertical alignment liquid crystal display (MVA LCD) according to a first embodiment of the present invention.
Figure 3:
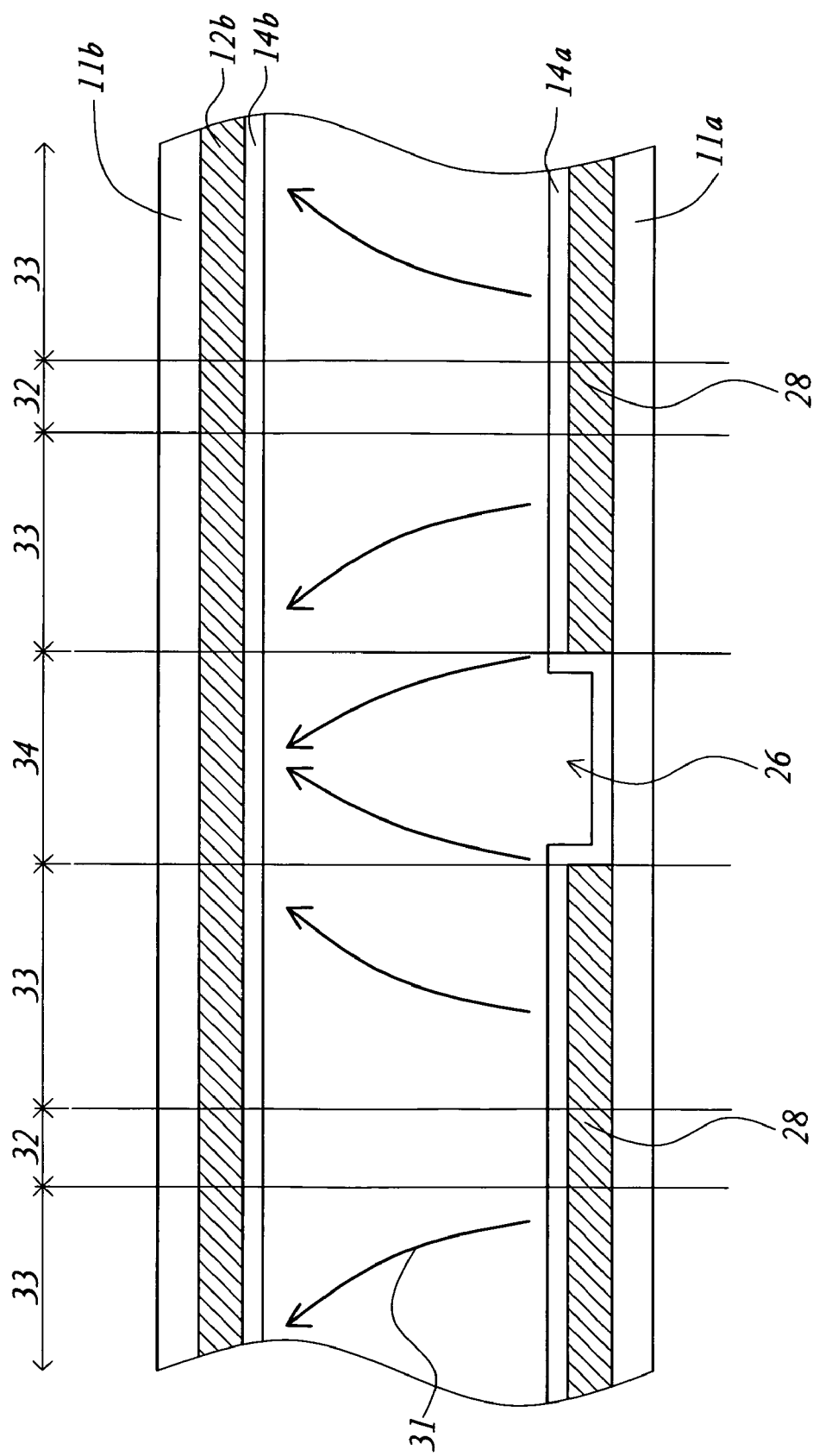
FIG. 3 is the cross section of FIG. 2 along the AA line.

Referring to both FIG. 2 and FIG. 3, FIG. 2 shows a top view of one pixel unit for the multi-domain vertical alignment liquid crystal display (MVA LCD) according to a first embodiment of the present invention. FIG. 3 shows the cross section of FIG. 2 along the AA line as indicated in FIG. 2. In FIG. 3, the MVA LCD includes a substrate 11a, a substrate 11b, a common electrode 12b, a pixel electrode 25, a vertical alignment film 14a, a vertical alignment film 14b, and a liquid crystal material between the substrate 11a and 11b. The liquid crystal material is a negative type, such that the liquid crystal molecules are inclined to be substantially perpendicular, i.e, at the angle of about 85~90 degree, to the direction of the electric field. In FIG. 2, one pixel of the MVA LCD at least includes a data line 21, a gate line 22, a source 23, a drain 24, and a pixel electrode 25. The pixel electrode 25 has a main slit 26 of longshape, two main electrodes 28 of long shape, and four grating electrodes. The main slit 26 is positioned on the diagonal line of the pixel electrode 25, and the main electrode 28 is substantially parallel to the main slit 26. The grating electrodes are on the two sides of the main electrode 28. The grating electrode consists of a plurality of slender sub-slits 27 and a plurality of slender sub-electrodes 29. The sub-slits 27 alternate with the sub-electrodes 29.

When a voltage is applied across the pixel electrode 25 and the common electrode 12b, the main electrode 28 and the common electrode 12b have a higher absolute voltage difference than the grating electrode and the common electrode. The main slit 26 and the common electrode 12b have the lowest absolute voltage difference. In FIG. 3, lines 31 represent the direction of the electric fields 31. Areas 32 have the strongest electric field, and correspond to the main electrode 28. Areas 33 have the second strongest electric field, and correspond to the grating electrode. Areas 34 have the weakest electric field, and correspond to the main slit 26. The lines 31 correspond to electric fields with different directions in different areas of the same pixel unit. Therefore, liquid crystal molecules of the same pixel unit will have different tilt angles forming "multi-domains". Thus, the first embodiment of the present invention accomplishes a multi-domain effect by simply creating slits on the substrate.

Figure 4:
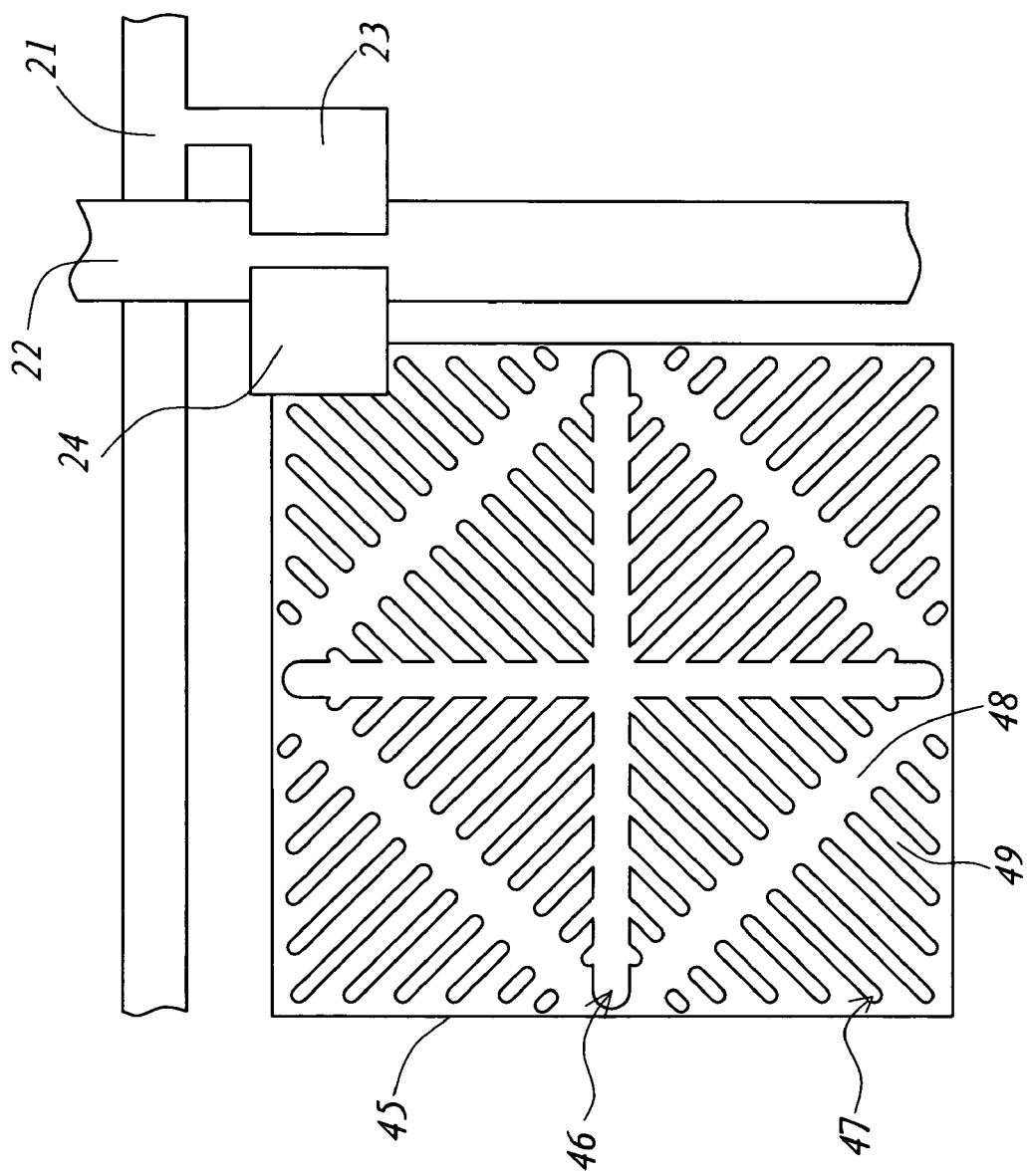
FIG. 4 is a top view of one pixel unit for the MVA LCD according to a second embodiment of the present invention.

FIG. 4 shows a top view of one pixel unit for the MVA LCD according to a second embodiment of the present invention. One pixel of the MVA LCD at least includes a data line 21, a gate line 22, a source 23, a drain 24, and a pixel electrode 45. The pixel electrode 45 has two main slits 46 of long shape, four main electrodes 48 of long shape, and four grating electrodes. The pixel electrode 45 is divided into four domains by the main slit 46. The grating electrodes are on the two sides of the main electrode 48. The grating electrode consists of a plurality of slender sub-slits 47 and a plurality of slender sub-electrodes 49. The sub-slits 47 alternate with the sub-electrodes 49.

When a voltage is applied across the pixel electrode 45 and the common electrode, the main electrode 48 and the common electrode have a higher absolute voltage difference than the grating electrode and the common electrode. The main slit 46 and the common electrode have the lowest absolute voltage difference. The electric fields produced have different directions in different areas of the same pixel unit. Therefore, liquid crystal molecules of the same pixel unit will have different tilt angles, forming "multi-domains".

The second embodiment of the present invention achieves the multi-domain effect by simply creating slits on the substrate. The present invention omits the step of manufacturing bumps, reducing the time taken to fill the liquid crystal material by about two thirds.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-domain vertical alignment liquid crystal display (MVA LCD) comprising:
    a first substrate and a second substrate, wherein said second substrate is positioned apart from said first substrate and is parallel to said first substrate;
    a liquid crystal material filling the space between said first substrate and said second substrate;
    an alignment film aligning liquid crystal molecules of said liquid crystal material being substantially perpendicular to the surface of said alignment film while no voltage is applied;
    a common electrode on the inner side of said second substrate; and
    a plurality of pixel electrodes on the inner side of said first substrate and defining a plurality of pixel units, said plurality of pixel units disposed in a matrix arrangement, each of said plurality of pixel electrodes having a first electrode, a second electrode, and a third electrode, when a voltage is applied to said pixel electrode, said first electrode and said common electrode have the higher absolute voltage difference than said second electrode and said common electrode, and said third electrode and said common electrode have the lowest absolute voltage difference.

2. The MVA LCD according to claim 1, wherein said liquid crystal material is negative type.

3. The MVA LCD according to claim 1, wherein said third electrode is a main slit for dividing said pixel electrode into a plurality of section electrodes, such that said pixel unit having a plurality of domains, each of said plurality of section electrodes comprising:
    a main electrode on the middle of said plurality of section electrodes, wherein the main electrode is of the first electrode; and
    a grating electrode on the two sides of said main electrode, said grating electrode having a plurality of sub-slits and a plurality of sub-electrodes, wherein said plurality of sub-electrodes alternate with said plurality of sub-electrode, wherein the grating electrode is of the second electrode.

4. The MVA LCD according to claim 3, wherein said main slit is broader than said plurality of sub-electrodes and said plurality of sub-slits.

5. The MVA LCD according to claim 3, wherein said main electrode is broader than said plurality of sub-electrodes and said plurality of sub-slits.

6. The MVA LCD according to claim 3, wherein said main slit divides said pixel electrode into said plurality of section electrodes diagonally.

7. The MVA LCD according to claim 6, wherein said main electrode is substantially parallel to said main slit.

8. The MVA LCD according to claim 3, wherein each of said plurality of pixel electrodes has a plurality of said main slits crossing to each other, said plurality of main slits for dividing each of said plurality of pixel electrodes into a plurality of section electrodes.

* * * * *